Fig. 1.

INVENTOR
JEAN PAYMAL
BY
ATTORNEY

Fig. 2.

INVENTOR
JEAN PAYMAL
BY *Samuel Felom*
ATTORNEY

June 12, 1973  J. PAYMAL  3,738,895
APPARATUS FOR MAKING LAMINATED STRUCTURAL PANELS OF
CELLULAR FOAMED RESIN
Original Filed March 14, 1968  8 Sheets-Sheet 4

INVENTOR
JEAN PAYMAL

BY
ATTORNEY

United States Patent Office 3,738,895
Patented June 12, 1973

3,738,895
APPARATUS FOR MAKING LAMINATED STRUCTURAL PANELS OF CELLULAR FOAMED RESIN
Jean Paymal, Clermont, France, assignor to Compagnie de Saint-Gobain, Neuilly-sur-Seine, France
Original application Mar. 14, 1968, Ser. No. 713,153, now abandoned. Divided and this application Dec. 16, 1971, Ser. No. 209,001
Claims priority, application France, Mar. 22, 1967, 99,785; Dec. 11, 1967, 131,728; Dec. 28, 1967, 134,050
Int. Cl. B31f *1/00;* B32b *5/18;* B29d *27/00;* B29g *7/02*
U.S. Cl. 156—443                                    29 Claims

ABSTRACT OF THE DISCLOSURE

The production of laminated structural panels, particularly for buildings, composed of a cellular core of foamed resin with facing layers of a hardenable resin, with or without reinforcement, which are assembled in such ways that the foaming of the core resin occurs simultaneously with the hardening of the resin of the facing layers so that the assembly is integrated effectively, giving rise to no faulty joints or deleterious stresses, and thereby imparting maximum strength characteristics to the panels.

---

This is a divisional of application Ser. No. 713,153, filed Mar. 14, 1968, now abandoned.

The present invention relates to composite laminated panels, used particularly in the construction of buildings, which comprise a central part of cellular resin covered on at least one of its surfaces with a layer forming a facing which is more rigid, harder and less fragile than the cellular central part. The resins most often used to produce the latter are those of the polyurethane family, polystyrenes, polysulfones, phenolic resins, polyethylenes, fluoroethylene-propylenes and vinyl resins. In order to produce the facing or facings, heat-hardening resins are used, with or without reinforcements.

At present, the manufacture of these panels is executed in the following ways:

(1) The central part of cellular resin and the covering layers are formed separately, and the whole structure is assembled by gluing. This procedure has the drawback of being a complicated operation, and results in high net costs of the product.

(2) Prefabricated sheets of the material above are produced to serve as facing layers, and on one of them, functioning as a support, is deposited the resin mixed with the foaming agent, which is superposed by another facing sheet. The expansion of the resin in the course of its assuming the cellular state, results in the filling of the space between the two facing sheets and the adherence of the cellular resin to the two facing sheets. After the cellular resin has hardened, a rigid composite panel is obtained. However, it has been established that at times harmful stresses appear in the cellular resin in the areas of contact with the facing sheets. These stresses facilitate and lead to the rupture of the material through loosening of the facings, loosening which tears out a small pellicle of the cellular resin.

(3) According to another method of manufacture, the facings are formed directly on the prefabricated central part of cellular resin. The heat-hardening resin of the facing sheets rigidify after application to the core of cellular resin. One of the frequent drawbacks of this process is the creation of stresses between the core of the resulting composite panel and the facings. If the shrinkage of these facings is too great, these stresses bring about shearing of the cellular material constituting the core, or splitting of the facings.

It is the object of the invention to provide a process which avoids the drawbacks of these different methods of manufacturing composite panels.

According to this process, the facing layer or layers are formed simultaneously with the core layer of foam. This process comprises, in order to form the latter, starting with a resin having a viscous doughy or pasty consistency and capable of forming a foam, and placing in contact with this resin, over at least one of its surfaces, a heat-hardening resin compatible with the first one, and simultaneously effecting the formation of the foam as well as the adhesion and bonding of the two resins.

The resin constituting the core or central cellular part may be advantageously a polyurethane, an epoxide or a polyester foam. The resin forming the facing or facings may itself advantageously be a polyester or epoxide resin, possibly reinforced with mineral fibers, such as fiber glass cloth or tissue, to thus form a lamination.

One mode of execution of the process in accordance with the invention consists in conducting a mat of mineral fibers onto a movable support, impregnating this mat or tissue with a heat-hardening resin, such as polyester or epoxide resin, then optionally heating this resin in order to induce partial gelling or hardening, spreading the core-forming resin in paste form, such as polyurethane, epoxide, or polyester resin, prior to its transformation to a foam, onto the layer thus formed, and assuring the adhesion and bonding of the foam to the exterior heat-hardening resin by the effect of the pressure exerted by the formation of the foam.

To obtain a panel provided with two facings, the resin designed to form the cellular core of the panel is inserted between the two layers of heat-hardening resin, which may have been previously reinforced with fibers, such as glass fibers, and which may have been partially gellified or hardened.

The operation may be executed advantageously on a horizontal level, by using a bottom support for the resin before forming the lower facing and an upper support for the resin before forming the top facing. The lower support may be an endless belt of metal, rubber, or other suitable material, at one end of which the resin for the lower facing is distributed. The upper support may be a sheet of cellophane or other material which is coated with the resin for the upper facing, this resin being sufficiently sticky and thixotropic so that it adheres to the sheet after the latter turns reversely, after possibly partial gelling or hardening, as it advances into contact with the resin of the core of the panel. An expansible material is fed to the core-forming resin which is deposited on the bottom support before forming the foam. This material, being inserted between the facing resins on the top and bottom supports, is limited in its expansion by the distance separating these supports. The desired spacing between the two supports is maintained by any suitable device such as, for example, a second endless belt parallel to the first.

It is possible to supply heat to the panel during its fabrication, or, conversely, to remove some, in the case where the foaming reactions of the core and the hardening reactions of the resin of the facings would be too exothermic. However, by using polyurethane for the core and a polyester resin for the facings, it may be unnecessary to provide for cooling or heating the panel, since the heat released by the foam during its formation permits the suitable hardening of the core-resin and that of the facings to take place at the same time.

It is likewise possible to use a facing layer in the form of a surface which is not reinforced, which may be constituted by a resin which is previously deposited on the cellophane, or a coat of paint, for example vinyl, applied after manufacture of the panels.

The invention also contemplates the introduction of the core resin before foaming between two sheets of the material before they form the facing layers, in enclosing the resin between these two sheets before it begins to expand, the two sheets thus constituting a tight envelope containing the foam resin, and in inducing formation of the foam and the bonding of constituent resins of the sheets and the foam.

According to one mode of execution of this last-mentioned procedure the resin is deposited, before forming the core of the panel, on a bottom tray-shaped sheet, the ensemble is covered with an upper sheet, and the edges of the two sheets are compressed together during the advance of the ensemble, in order to assure adherence of the two edges and to form the fluid-tight envelope in which the resin of the core is transformed to foam.

According to another method of operation, the lower sheet is given a flat form, a twisted cord which adheres to the sheet is applied thereto near each of its sides, the resin is spread on this sheet between the two cords before forming the core, the latter is covered with the second sheet, and the two borders of the two sheets are compressed, in order to form the envelope at the interior of which the resin of the core is changed into foam while the envelope is inflated.

The invention also contemplates devices for executing these procedures, these devices comprising particularly systems of pincers or clamps mounted on conveyors which grab the edges of the sheets and press them together during formation of the foam and the bonding of this foam to the resin constituting the sheets.

The invention also contemplates the introduction of the core resin, before foaming, between two sheets of material before they form the facing layers, as well as between two laterally displaced side members also disposed between said sheets, and inducing the formation of the foam in the space defined by the sheets and the inner walls of the side members, and the bonding of the constituent resins of the sheets and the foam as well as the bonding of the edges of the sheets with the side members.

It is also the object of the invention to provide an apparatus for realizing these objectives which contemplates a system of clamps which is designed particularly to seize the edges of the upper sheet of material and to maintain it in a stretched condition, while pushing elements act upon the side members to maintain them in position during the transformation of the core resin into a foam, these clamps and pushing elements being mounted on conveyors.

Other characteristics and advantages of the invention will appear from the following description of several embodiments thereof and modes of execution which are given by way of example only, in conjunction with the annexed drawings, wherein

Figure 1:
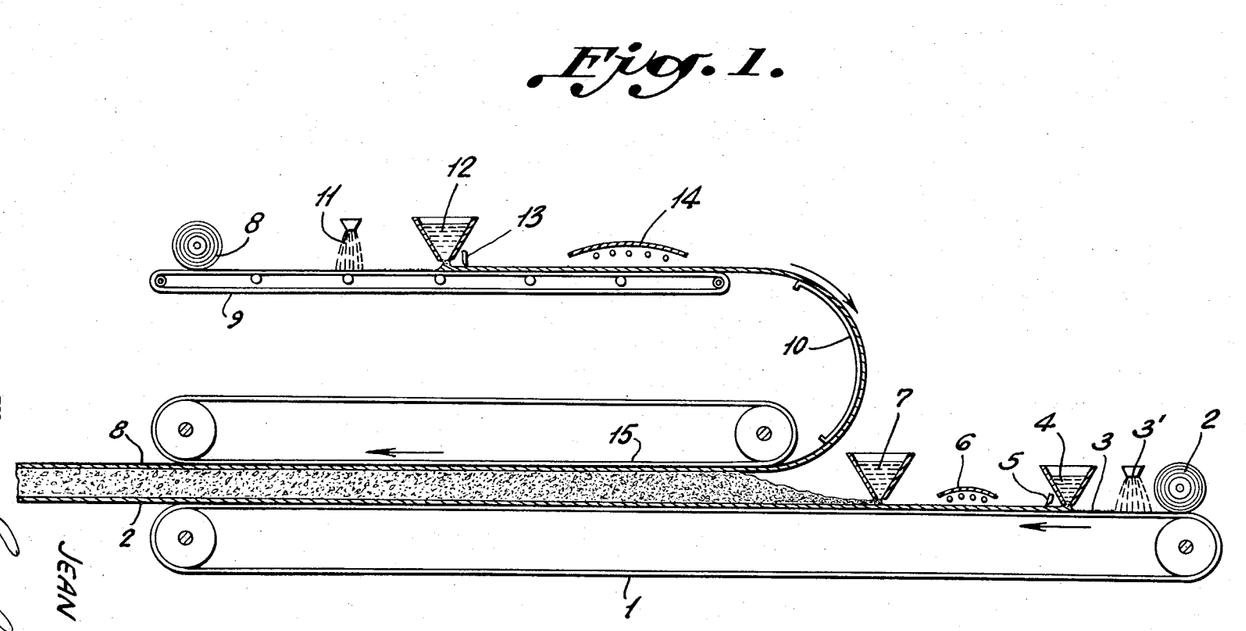
FIG. 1 is a front elevation, with certain parts in section, of a schematic layout of an apparatus for producing laminated panels in accordance with the invention.
Figure 2:
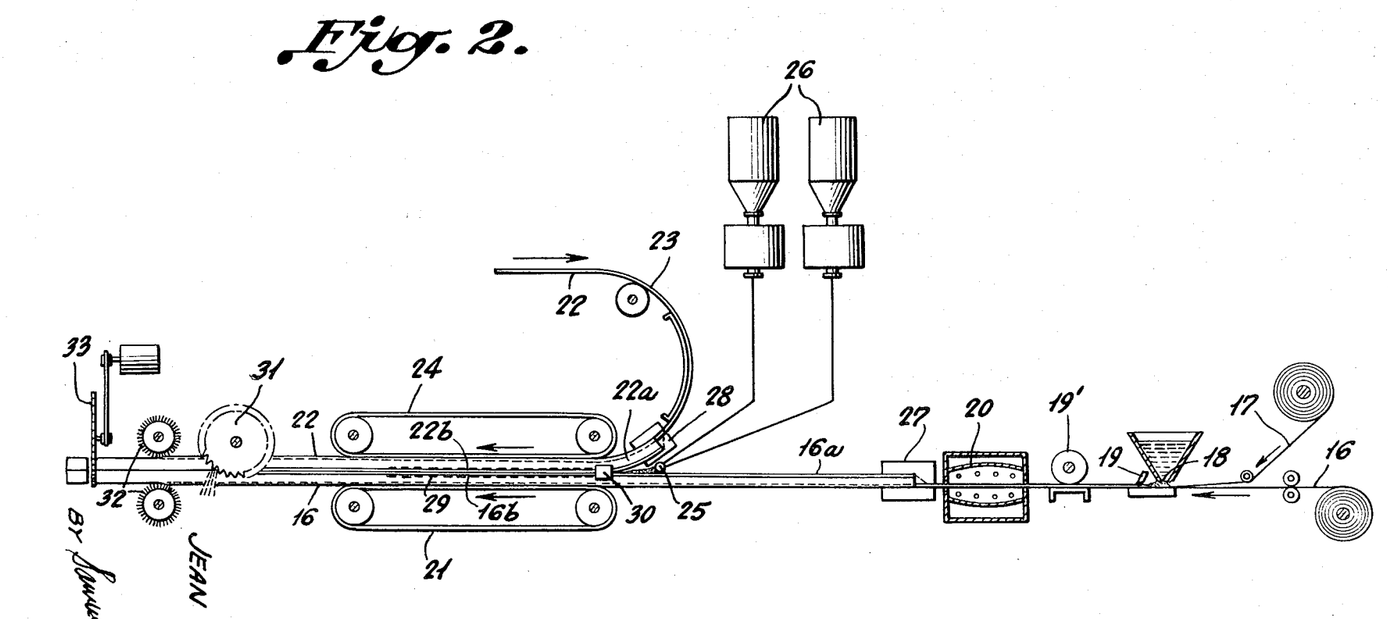
FIG. 2 is a view similar to FIG. 1 of another embodiment of the apparatus.
Figure 3:
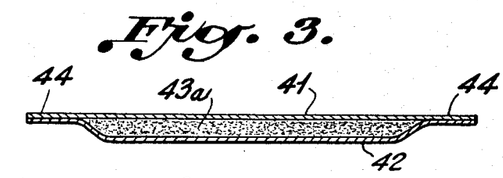
FIG. 3 is a transverse sectional view of a panel produced in accordance with another embodiment of the invention, at an intermediate stage of its production.
Figure 4:
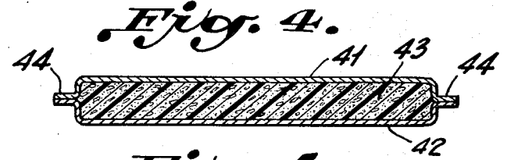
FIG. 4 is a sectional view of the finished panel shown in FIG. 3.

FIGS. 1 and 2 illustrate schematically the manufacture of a building panel composed of a sheet or core of polyurethane foam and two facings of laminated polyester resin.

As shown in FIG. 1, an endless conveyor belt 1, which is covered by the unwinding of a sheet of cellophane 2 from a reel above one end of the conveyor belt, has formed thereon a mat 3 of severed glass fibers 3', or a cloth or tissue of such fibers which is impregnated with polyester resin 4. If desired, a prefabricated mat may be unrolled in advance of the resin-impregnating station 4. A scraper 5 equalizes the thickness of the resin. An infrared radiant heating device 6 induces partial gellification or hardening of the resin. Polyurethane cream 7 is spread uniformly over the entire effective width of the belt. In addition, on the upper support constituted by a sheet of cellophane 8, suitably supported by a light endless belt 9 and by metallic slides 10, another mat of glass fibers 11 is formed similar to the one on conveyor belt 1, which is impregnated with resin 12, the thickness of which is regulated by scraper 13. The polyester resin undergoes partial gelling under the effect of infrared radiant heater 14. The cellophane covered with a suitable thickness of resin and glass fibers is turned during a return motion of the support so that the resin is beneath the cellophane and thus comes into contact with the resin 7 in its partially expanded state which was deposited onto belt 1, and which undergoes an expansion into foam upon entering the part of the machine wherein two parallel belts overlie each other. The upper belt 15 of the machine confines the rising of the foam and assures a certain pressure which favors adherence and bonding of the foam to the polyester resin. The length of belt 15 relative to lower belt 1 is determined as a function of the advancing speed thereof, so that before exit of the material therebetween, the foam has completed its expansion and its bonding, on the one hand, and on the other hand, the polyester facings have become hard and rigid.

The edges of the assembly may be free if the thickness of the foam is not too great, or preferably they may be confined by stationary or movable foot-boards. In the first case, it is desirable to cut off the borders of the panel upon its exit from the machine in order to obtain clean edges.

The device shown in FIG. 2 is similar to that of FIG. 1. It permits obtaining panels, the borders of which are faced in the same way as are the facings.

In this figure, the start of the cellophane band is indicated at 16, onto which is superposed or deposited a mat 17 of glass fibers. The mat is impregnated with resin issuing from hopper 18 which is scraped smooth by scraper 19 and a smoothing roller 19' as the web travels to the infrared radiant heater 20 towards the endless conveyor belt 21. The second line, conducting the upper cellophane band 22 with the coating of resin thereon is shown at 23, and is similar to that shown in FIG. 1. This band passes under endless belt 24.

The polyurethane resin is introduced between the two bands of cellophane covered with resin by means of guns or distributing nozzles 25 supplied from reservoirs 26. In order to facilitate maintaining the upper cellophane band against its supporting belt, it is possible to provide a suction device in the latter. There may also be provided, at the entrance of the two belts, a casing in which high pressure is maintained and which contains the apparatus for supplying the resin.

The cellophane sheets 16 and 22 have a width greater than that of the layers of resin thereon. Upstream of the zone where the foam is formed, that is, ahead of the belts 21 and 24, shaping members 27 are provided, which lift up the edges 16a from sheet 16 which are covered with resin. Likewise, shaping members 28 turn down edges 22a from sheet 22 also covered with resin.

During formation of the panel, pinching or pressing devices 29 join together the bent or folded edges 16b and 22b of the two bands which have come into contact with one another. Also, devices 30 at the inlet between the belts 21 and 24 may be provided which present supplementary sealing cords impregnated with resin.

At the exit end of the machine, a saw 31 cuts off the lateral pinched or clamped portions, in order to obtain clean edges. Brushes 32, operating in the presence of water, tear off the cellophane before or after the transverse cutting of the laminated product into panels of the desired length, by means of the cutting mechanism 33.

In a general way, unsaturated polyesters may be used on occasion in a mixture, and modified by a reactive monomer such as styrene so as to obtain the desired properties of viscosity, reactivity, density, etc. Pre-gelled polyester resins, capable of being formed under the effect of low pressure, may also be used. The numerous classic polymerization catalyzers may be used, such as the peroxide of methyl-ethylacetone, which brings about rapid gellification or solidification. The polymerization accelerators, such as cobalt naphthenate, diethylaniline, or laurylmercaptan may be used if the quantity of heat released by the foam is insufficient to induce an increase in temperature of the polyester, sufficiently high for a rapid polymerization. This is the case in particular with thin panels constituted by a small thickness of foam.

The usual polyester reinforcements such as mineral fibers, glass fibers, or asbestos fibers are particularly suitable for obtaining rigid panels having very good mechanical properties. Other types of reinforcements may be used, such as, for example, those obtained by incorporation of different issues or fabrics.

The additions currently used with polyester resins are advantageous from several points of view. They modify the rheological properties of the resin; the bentonites, the powdered polyvinyl chlorides, for example, impart thixotropy to the mixture, which is particularly desirable for the upper facing which is used in the devices described above, because it is turned downwardly with the resin underneath its support. Furthermore, the additions decrease shrinking and the risks of cracking, and the creation of fissures during polymerization, and permit opacification or coloring of the laminated sheet. In addition to those mentioned above, there may also be used the usual fillers or loading ingredients such as calcium carbonate, dolomite, kaolin, mica, asbestos, calcium sulfate, barium sulfate, talc, etc. Also, fireproofing substances may be added, such as antimony trioxide and the chlorinated waxes which increase resistance to combustion.

As constituents of the material forming the facings, the usual mixtures for the manufacture of flat or undulated reinforced polyester sheets may be used, for example, one of the following formulas by weight:

FORMULA I

| | |
|---|---|
| Styrene polyester resin, with high reactivity | 100 |
| Styrene | 5 |
| Hydroperoxide of methylethylacetone | 2 |
| Cobalt naphthenate (6%) | 0.2 |
| Slightly absorbent fillers | 120 |
| Glass fibers | 15 |

This formula is especially suitable in the case of panels of small thickness for which the amount of heat applied by foaming of the core material is not great.

FORMULA II

| | |
|---|---|
| Polyester resin of high reactivity | 100 |
| Peroxide of benzoyl | 2 |
| Fillers or mixtures of different slightly absorbent fillers | 80 |
| Glass fibers | 15 |

This formula is particularly suitable for the production of thick panels, in which case use is made of a core material of a foam exhibiting high exothermic properties during its expansion and hardening, or in the case when heat is added by the heating of the machine.

FORMULA III

| | |
|---|---|
| Polyester resin of high reactivity | 100 |
| Peroxide of benzoyl | 2 |
| Fine silica | 2 |
| Bentonite | 5 |
| Dolomite | 80 |
| Glass fibers | 25 |

This formula permits obtaining a thixotropic mixture which remains very adherent to the cellophane support and does not flow even in vertical position.

FORMULA IV

| | |
|---|---|
| Polyester resin of high reactivity | 100 |
| Catalyzers and accelerators | 2 |
| Fillers | 80 |
| Antimony oxide | 13 |
| Chlorinated paraffin | 5 |
| Glass fibers | 15 |

This formula gives rise to a self-extinguishable product. This characteristic may also be obtained without adding chlorinated paraffin and antimony oxide, i.e., by using a type of polyester resin which is itself self-extinguishable, for example, one with a tetrachlorophthalic acid base.

The composition of polyurethane used for the core is prepared in such a way as to obtain a creamy consistency for quite a brief time, and a medium time of foaming. It is necessary that the start of foaming take place a short time after the material starts on the lower conveyor, but preferably only after a second travel of the supply gun, in the case where the latter is driven by an alternating to-and-fro movement. The foaming itself should be fast enough to limit the length of the machine, and long enough not to cause irregularities in the cellularization of the product. By way of example, the following composition may be used as a quasi-prepolymer:

Composition of the polyurethane foam:
| | |
|---|---|
| Isocyanate | 100 |
| Polyhydric alcohol (polyol) | 100 |
| Freon | 25 |
| Silicone | 1.5 |
| Catalyzers (diamino triethylene 0.2, dibutyl-dilaurate tin 0.08) | 0.28 |
| Antimony oxide | 10 |

Among the advantages realized by the process according to the invention, the following, in particular, may be cited:

The layer of polyester resin on which the polyurethane foam is to be poured is only slightly warm and is a relatively poor heat conductor. The result is that, contrary to what is frequently produced in other processes, the peripheral layers of polyurethane do not acquire a higher density than that of the foam core, and thus the homogeneity of the foam is greatly improved. The presence of the polyester layer on both sides of the foam is thus an advantage for the good development of this foam. Reciprocally, the presence of the foam being formed is favorable to the hardening of the polyester, since the heat liberated by the polyurethane foam raises the temperature of the panels being produced which accelerates the speed of hardening of the polyester.

The considerable shrinking which accompanies polymerization of the polyester resins causes unfavorable stresses in many of the usual applications. In fact, this shrinking is from 3% to 6% for a resin without fillers and from about 0.2% to 2% for a resin containing fillers. If this polyester resin is deposited on an insulating support, the resin adheres to this support, gellifies in place and the layer tends to shrink during hardening. If the insulating support is constituted by an organic foam, generally the relative mechanical properties of the polyester and of the foam are such, that a break of the foam is produced in a plane very slightly below the surface in contact with the polyester. On the other hand, by virtue of the invention, shrinkage takes place before the foam is completely hardened, and hence stresses do not appear in consequence of a possible rearrangement of the material. The result is that there can be no stresses between the core and the facings on the finished panels, and consequently no risk of separation between them. This advantage is very important for self-bearing panels, which must support loads or be subjected to varied mechanical strains, without change in their properties or characteristics. The panels used in building construction also undergo mechanical stresses due to possible variations in atmospheric temperature between the two surfaces of the panel. In the case where the panels have pre-existing stresses due to their method of manufacture, these temporary mechanical stresses, when superposed upon those encountered in use, give rise to the risk of their becoming too high and surpassing the limits of resistance to rupture of the material, which produce fissures and a consequent great degradation in the quality and structural characteristics of the panels.

Referring to the additional embodiments of the invention illustrated in the drawings, FIGS. 3 to 6 and FIG. 10 show the lower tray-shaped sheet 42 superposed by the upper sheet 41 with the resin 43 forming the core. The two edges of each of the sheets are joined together and form wings or flanges 44 which are sufficiently rigid after hardening to allow mounting of the panels thereby. These flanges may also serve as tenons which are set along their entire length in grooves provided in posts or beams, mounted between panels during the construction of a vertical or horizontal wall, for example.

Figure 5:
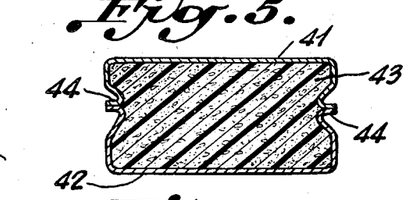
FIGS. 5 and 6 are sectional views of variant embodiments of the panel shown in FIG. 4.
Figure 6:
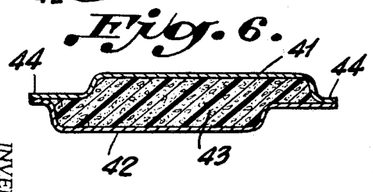
Figure 10:
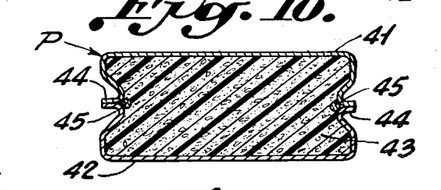
Figure 11:
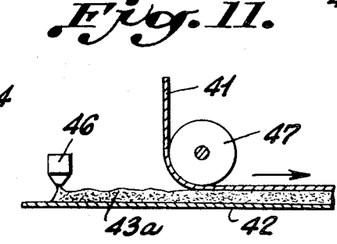
FIG. 11 is a front elevation, with certain parts in section, showing the starting end of an apparatus for forming the panels shown in FIGS. 3 to 6.

In the case of manufacture of panels of a certain thickness, the clamps used for joining the sheets may have such a shape that they give special profiles to the borders of the panels, such as those shown in FIGS. 5, 6 and 10. The flanges also may be given particular shapes to facilitate the mounting of the panels or the attainment of fluid-tight joints between either the two adjacent panels or between a panel and another structural element.

It will be observed that the forms shown in FIGS. 5 and 10 have the advantage that the flanges do not extend beyond the planes of the sides. The form shown in FIG. 6 allows ready detachability of the panels while attaining an overlapping during their use. It is possible, in the same way, to obtain flange shapes which are asymmetrical, for example, in order to attain an interfitting between the panels, one within the other, or in structural elements which make possible this interfitting.

The panels of FIGS. 3 to 6 are obtained by means of devices described below.

Figure 7:
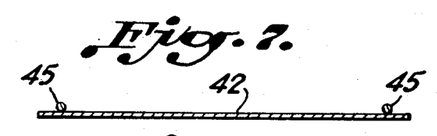
FIGS. 7 to 10 are transverse sectional views of the panel shown in FIG. 10, incorporating bonding cords, at different stages of its production.
Figures 8, 9:
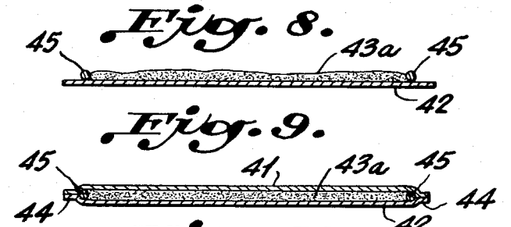

The panel of FIG. 10 is obtained by cords in the manner mentioned above. The two cords 45 are stuck onto the lower sheet 42 in stretched condition (FIG. 7). Between the two cords is placed the resin 43a, before foaming, and then the upper sheet 41 is fastened onto said cords. The finished panel P is obtained after foaming of the resin, which takes place while sheets 41 and 42 are held parallel with one another, and clamped at their flanges 44.

Cords 45 may be advantageously formed by cores of fiber glass impregnated with resin which is more or less gellified. These cords may also be used, particularly in the case of FIGS. 3 and 4, for joining the two sheets, so as to reinforce their adherence and to avoid curling up of the surfaces in this area. By using such cords, it is possible, without damaging the final strength of the panel, to saw off the flanges 44 of the panel flush with the edges thereof.

FIGS. 11 to 14 illustrate schematically a device for obtaining panels such as those illustrated in FIGS. 3 to 6.

Figure 12:
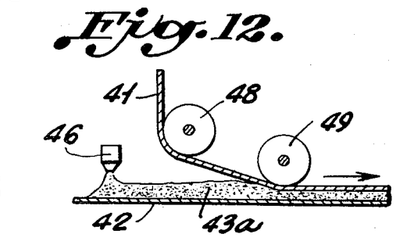
FIG. 12 is a view similar to FIG. 11, showing a slightly different embodiment.

The bottom sheet 42, shaped as a tray in transverse cross-section, travels below the distributor 46, wherefrom the resin 43a for the core is deposited onto the sheet 42, which is covered immediately by the upper sheet 41 at the same time that the edges of the two sheets are pressed together, causing the adherence of the edges of the two sheets together. The sheet 41 is fed progressively to the assembly so as not imprison any air in the envelope being formed. This progressive feeding is attained by passing sheet 41 under a cylinder 47 of suitable diameter (FIG. 11), or by imparting a certain angularity to the sheet by means of two cylinders 48 and 49 (FIG. 12).

Figure 14:
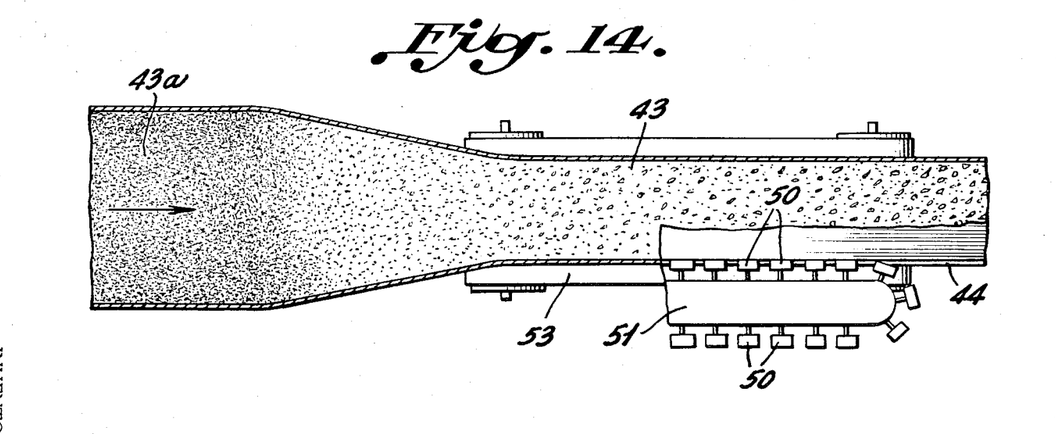
FIG. 14 is a plan view of FIG. 13 with portions broken away for the sake of clarity.

The resin 43a then begins to expand, inflating the envelope. During this expansion, the edges of the envelope are held tightly together by means of clamps 50 carried by conveyors 51. These conveyors are arranged so that their clamps allow the edges of the sheets to come together and consequently the width of the sheets is decreased (FIG. 14). During this interval, the sheets travel toward the outlet of the apparatus, while being held by horizontal upper and lower endless belts 52 and 53, respectively, thus forming a sort of continuous press. The swelling or expansion of the resin is thus limited toward the top and the bottom, and after the expansion is ended and the resin of the sheets is bonded to that of the foamed resin, there result the products of the type shown in FIGS. 4, 5 and 6. The transverse section of these products has the general form of a more or less elongated rectangle, the corners of which are naturally rounded. The shape of this section is obtained by setting the two lateral conveyors 51 supporting the clamps 50 in such a position that these clamps are at the desired distance from one another.

Figure 13:
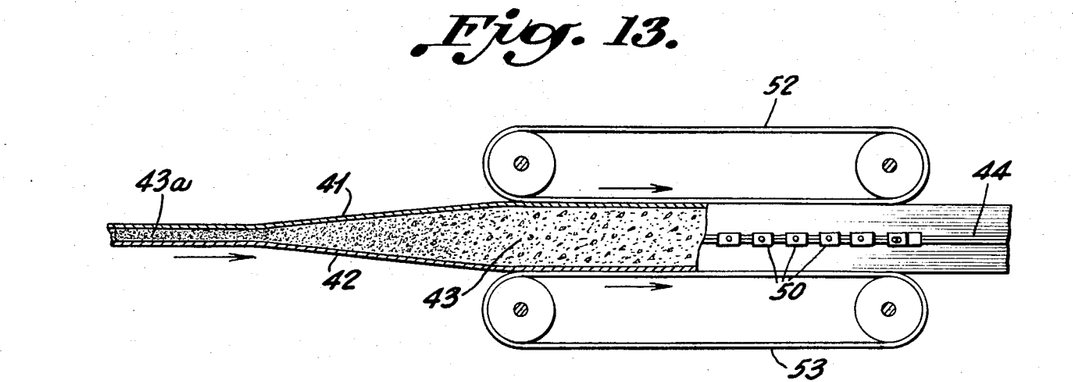
FIG. 13 is a front elevation with certain parts in section showing the outlet end of the apparatus for forming the panels shown in FIGS. 3 to 6.

The hardening of the foamed resin of the core and the resin constituting the sheets takes place while the ensemble passes through the apparatus. The heat released by the resin of the core during this passage may be sufficient in certain cases to assure hardening of the sheets. Nevertheless, it may be necessary or desirable to accelerate hardening of the sheets by heating the endless belts 52 and 53, as well as the extremities of clamps 50.

The sheet material which, in its pliable or flexible phase, permits the forming of the envelope for the foaming resin, becomes, by passing through the apparatus, hard and resistant, so that the foam is finally encased by a material which is harder and more resistant than itself. Thus, a composite insulating panel is finally obtained which has excellent mechanical properties.

Figure 15:
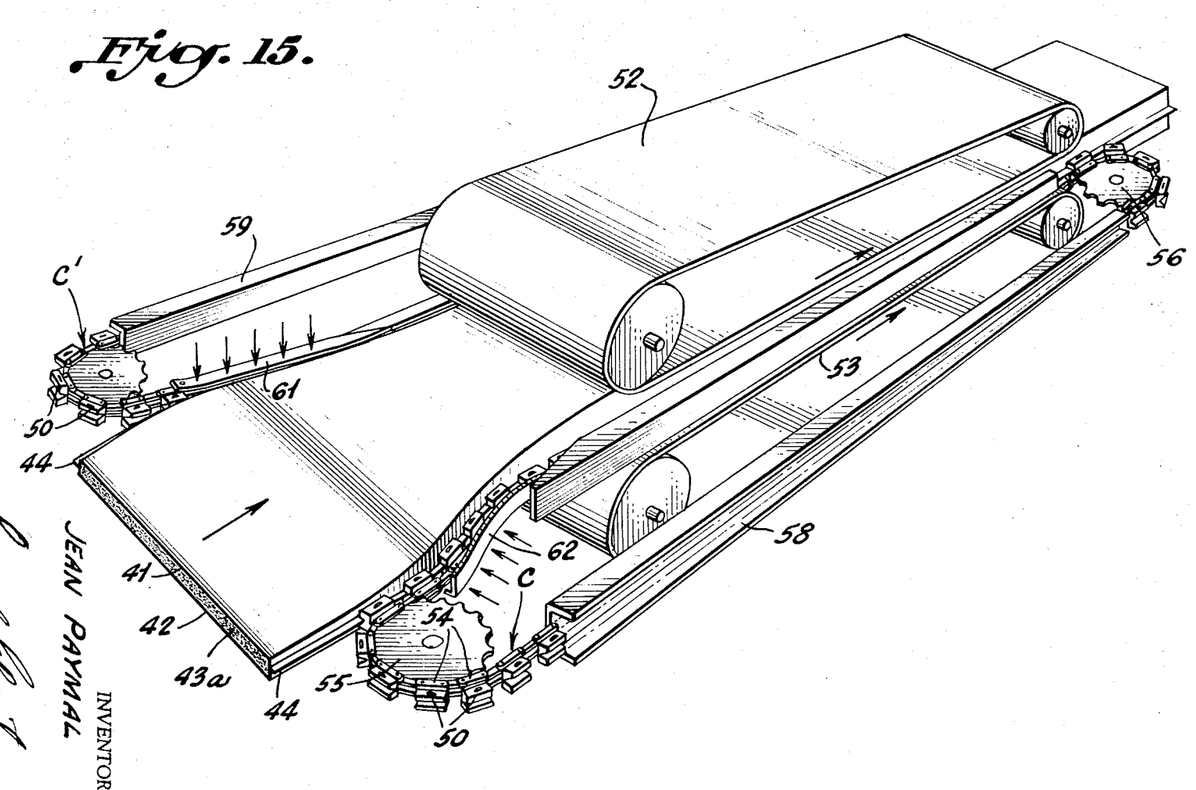
FIG. 15 is a perspective view of the apparatus shown in FIGS. 13 and 14.
Figure 16:
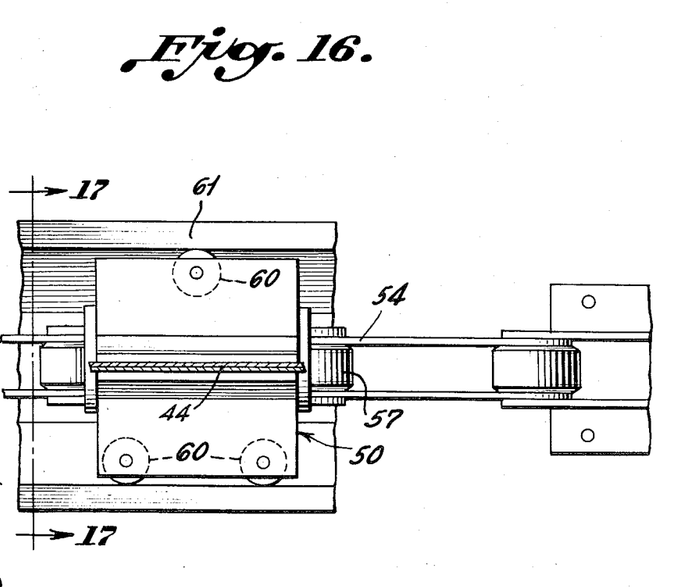
FIG. 16 is a front elevation of the clamping assembly as it travels along the rails.
Figure 17:
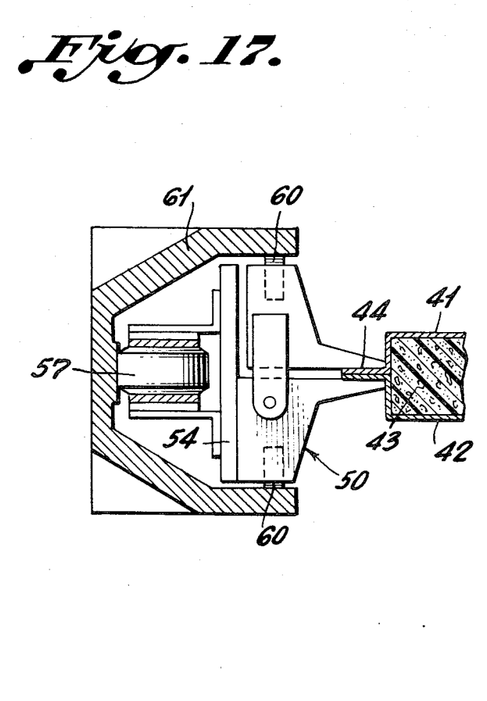
FIG. 17 is a vertical sectional view along line 17—17 of FIG. 16.

FIG. 15 shows an apparatus for clamping the edges of sheets 41 and 42, details of which are also shown in FIGS. 16 and 17. It comprises clamps 50 mounted on links 54 of two lateral chains C, C' passing over sprockets 55 and 56. These links with clamps are provided with end rollers 57 rolling on rails 58, 59. They also comprise lateral rollers 60 designed to bring close together the jaws of each clamp in order to assure its clamping together the flanges of the sheets (FIG. 17).

The chains C, C' travel in the guide rails 58, 59, during which time the clamps are open. They next arrive opposite the sheet flanges 44 and upon continuing their movement, they pass into rails 61 and 62, which effect closing of the jaws of the clamps onto the flanges. In addition, as shown in FIG. 15, the clamps are guided laterally by rails 61 and 62, to accommodate the decrease in the width of the product in the course of production. Closing of the jaws may also be provided by springs arranged on each of the clamps; the opening is then effected at the desired time by the action of suitable cams on the opening rollers of the jaws.

In the case where the laminated panel is previously brought to the desired shape, the apparatus does not require guide rails 61 and 62.

Figure 18:
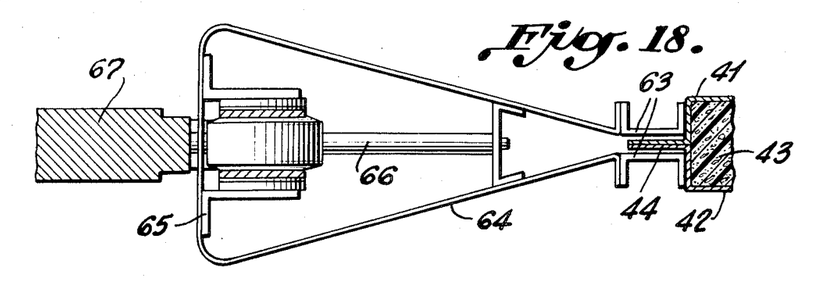
FIG. 18 is a sectional view of another embodiment of the clamping members acting on the facing sheets on one side of the panel being formed.
Figure 19:
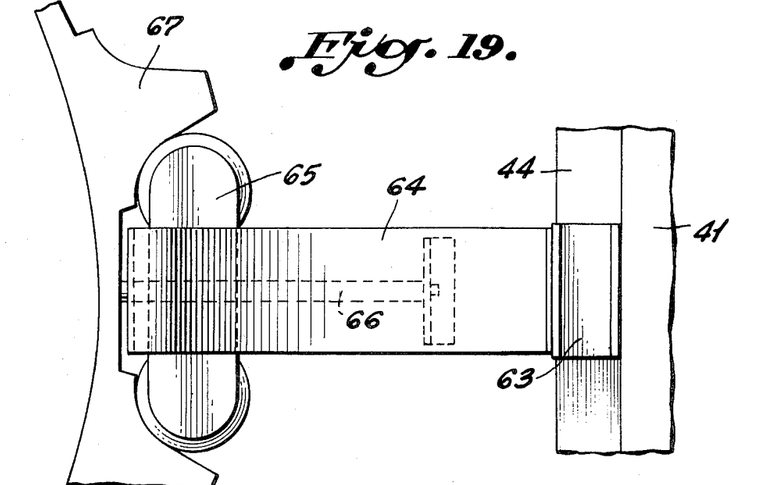
FIG. 19 is a plan view of FIG. 18.

FIGS. 18 and 19 show another type of clamp with jaws 63, the closing of which is effected by a spring blade 64, in the shape of a clamp which is fastened on a link of chain 65. The opening of the jaws 63 is effected by means of a push rod 66, this opening occurring when the rod contacts the end sprocket 67 at the outlet end of the conveyor.

Figure 20:
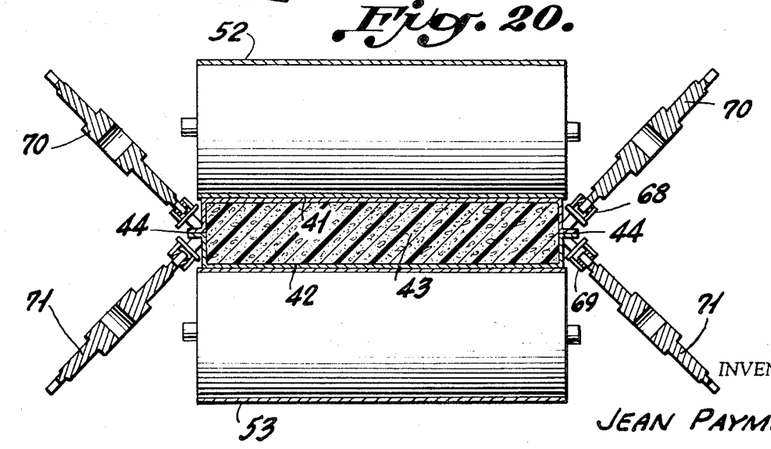
FIG. 20 is a transverse sectional view of the apparatus shown generally in FIGS. 11 to 15 with a modified clamping system for the sides of the facing sheets, which embodies revolving chains.

In the arrangement shown in FIG. 20, the clamping of the flanges is effected by means of chains 68, 69 turning in the inclined planes and passing over sprockets 70, 71. The clamping is effected at the moment the chains come into contact with flanges 44, this contact occurring perpendicularly to the planes of the cog wheels or sprockets 70, 71.

Figure 21:
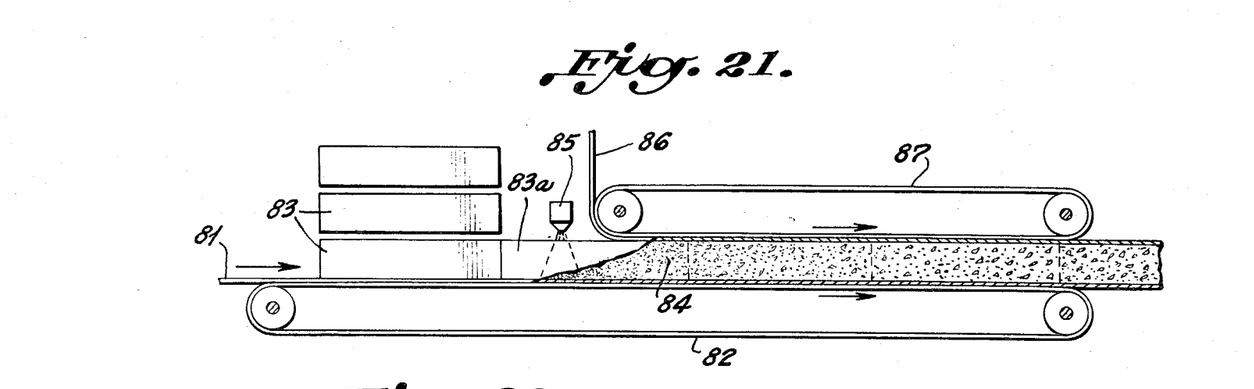
FIG. 21 is a front elevation, with certain parts in section, of another embodiment of the apparatus which includes the interposition of side members between the sheets for forming the facing layers, which together with the latter define the space for the foaming of the resin of the core.
Figure 22:
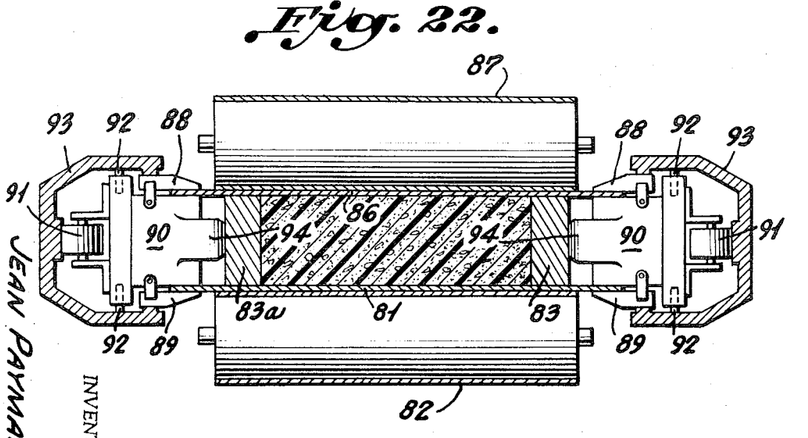
FIG. 22 is a transverse sectional view of the apparatus shown in FIG. 21 which shows pusher elements for retaining the side members in place during the foaming action of the core and the bonding thereof to the facing sheets and side members.
Figure 23:
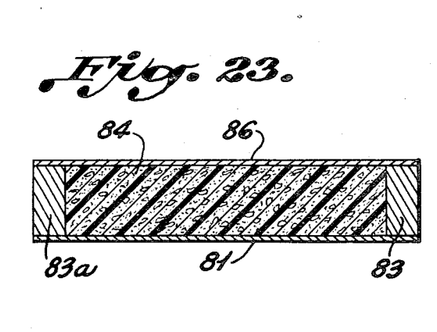
FIG. 23 is a transverse sectional view of the structural panel produced by the apparatus shown in FIGS. 21 and 22.

Another embodiment of the invention for producing a still different structural form of laminated building panel is shown in FIGS. 21 to 23.

As may be seen in FIG. 21, the sheet 81 constituting one of the facings of the panel, is fed continuously by an endless belt conveyor 82. The side members 83, 83a are disposed on each side of the sheet, these members being adapted to be fed by any suitable feeding apparatus. The resin 84, adapted to form the cellular core of the panel, is spread by distributor 85 onto the sheet 81 between the side members. The assembly constituted by the resin 84, the sheet 81 and the side members 83, 83a, is subsequently covered by the upper sheet 86 passing under the endless conveyor 87.

The resin 84 subsequently commences to expand in the space defined by the sheets 81 and 86 and the lateral side members 83 and 83a. During this expansion the sheets are maintained stretched by clamps and the side members are themselves held by devices which exert a pressure on them from the exterior towards the interior. At the same time, the sheets 81 and 86 are maintained in parallel relationship by the conveyors 82 and 87. The swelling of the resin thus finds itself limited in both an upward and downward direction by the sheets and laterally by the side members, the height of which corresponds substantially to the thickness of the panel being produced.

If the resin of the sheets is not sufficiently adhesive to effect a direct and good adherence with the side members, a light layer of adhesive may be deposited on the side members, or on the parts of the sheets which contact the latter.

Following the hardening of the assembly at the outlet of the machine, the edges of the facings which project beyond the side members may be cut, and if necessary, the facing layers and side members may be leveled and smoothed. Thus, a panel is obtained, the cross-section of which is shown in FIG. 23.

The side members 83, 83a may be constituted by a plastic material, with or without reinforcement, which is resistant to the hardening temperature of the facings and the foam, or by any material which preferably has a coefficient of expansion approximately that of the facings, for example, aluminum or its alloys, wood, an agglomeration of wood particles, etc. Likewise, it may be formed of a cellular product of any suitable density and mechanical resistance.

The form of the side members may be of parallelopipedic section with the longitudinal edges either rounded or sharp. One may easily provide more complex forms which will permit using these as fittings or connections between adjacent panels or between the panels and other structural members.

The form and the character of the side members may be chosen in a manner to improve the acoustic insulating qualities of the panels. In particular, it is possible to utilize side members of small section or formed of a resilient material for preventing phonic bridges between the two facings.

The side members may be rigid. They are then as in the example described above, introduced into the machine by means of a feeder in elements of definite length placed end to end. They may be sufficiently flexible in the direction of their length to assume a curvature, which permits their introduction into the machine in elements of great length. These side members may be introduced in continuous fashion at the beginning of their fabrication and disposed in proximity to the machine for the production of the panels.

In order to assure the stretching of the sheets and the retention of the side members against pressure exerted by the resin during its foaming, it is possible to use any clamping apparatus or suitable pressure exerting members. FIG. 22 illustrates an example of such.

The lower sheet 81 and the upper sheet 86 are stretched by means of clamps, having movable jaws 88 and 89 cooperating with the intermediate fixed jaws 90. The jaws 90 consist of the links of the lateral chains which roll on the rollers 91 on a vertical axis and the rollers 92 on a horizontal axis on the rails 93. The pressing members 94, among other elements, are mounted on the jaws 90 which operate against the side members 83, 83a.

It is possible for the upper sheet only to be stretched by means of clamps, the lower sheet being stretched by means of the play of the rollers which may be inclined slightly relative to the direction of movement of the sheet.

It is likewise possible to eliminate the stretching apparatus for the upper sheet, by maintaining air pressure thereon until after the termination of the expansion of the foam. In this case, the side members may be retained in place by laterally disposed rolls.

I claim:

1. An apparatus for producing laminated structural panels from compatible organic resins having a core of foamed resin with facing layers of hard resin integrally bonded to the opposite faces of the core, comprising:
   (a) means for forming a flexible layer of a heat-hardenable resin in situ by unreeling a thin flexible web for supporting said flexible layer comprising
   (b) means for depositing a mat of mineral fibers onto said web, and
   (c) means for impregnating said mat with a heat-hardenable resin in liquid form,
   (d) means for advancing said flexible layer of heat-hardenable resin;
   (e) means for depositing thereon a foam-forming resin in paste form, which is transformed into a cellular state in the course of its travel through the apparatus, (f) heating means for said resin-impregnated mat to partially gellify the resin preparatory to the deposition of the foam-forming resin thereonto, (g) means for forming a second flexible layer of a heat-hardenable resin in situ by unreeling a second thin flexible web for supporting said second flexible layer, (h) means for depositing a mat of mineral fibers onto said second web, (i) means for impregnating said last-mentioned mat with a heat-hardenable resin in liquid form, (j) means for advancing said second flexible layer into superposed substantially horizontal and uniformly spaced relation to said first flexible layer and foam-forming resin on the latter, by guiding said second flexible layer and its supporting web through a reversing turn to dispose said second layer into contact with the foam-forming resin at a desired substantially uniform spacing from the first flexible layer, (k) heating means for said second resin-impregnated mat to partially gellify the resin before the mat arrives in superposed relation to said first layer with the foam-forming resin thereon, and (l) means for conveying said flexible layers with the foaming resin therebetween for a sufficient distance to complete the foaming of the latter and the bonding thereof to the flexible layers as they harden to become facing layers for the core of foamed resin therebetween.

2. An apparatus as set forth in claim 1 wherein the thin flexible webs for supporting the two flexible layers of heat-hardenable resin are supplied from reels of plastic sheeting such as cellophane.

3. An apparatus for producing laminated structural panels from compatible organic resins having a core of foamed resin with facing layers of hard resin integrally bonded to the opposite faces of the core, comprising:

(a) means for forming a flexible layer of a heat-hardenable resin in situ by unreeling a thin flexible web for supporting said flexible layer comprising (b) means for depositing a mat of mineral fibers onto said web, and (c) means for impregnating said mat with a heat-hardenable resin in liquid form, (d) means for advancing said flexible layer of heat-hardenable resin;

(e) means comprising distributing nozzles moving alternately across the width of said flexible layer for depositing thereon a foam-forming resin in paste form, which is transformed into a cellular state in the course of its travel through the apparatus, (f) heating means for said resin-impregnated mat to partially gellify the resin preparatory to the deposition of the foam-forming resin thereonto, (g) means for forming a second flexible layer of a heat-hardenable resin in situ by unreeling a second thin flexible web for supporting said second flexible layer, (h) means for depositing a mat of mineral fibers onto said second web, (i) means for impregnating said last-mentioned mat with a heat-hardenable resin in liquid form, (j) means for advancing said second flexible layer into supposed relation to said first layer and foam-forming resin on the latter deposited by said distributing nozzles, by guiding said second flexible layer and its supporting web through a reversing turn to dispose said second layer into contact with the foam-forming resin at a desired spacing from the first flexible layer, (k) heating means for said second resin-impregnated mat to partially gellify the resin before the mat arrives in superposed relation to said first layer with the foam-forming resin thereon, and (l) means for conveying said flexible layers with the foaming resin therebetween for a sufficient distance to complete the foaming of the latter and the bonding thereof to the flexible layers as they harden to become facing layers for the core of foamed resin therebetween.

4. An apparatus as set forth in claim 3 including means for turning up the opposite edges of the first flexible layer and turning down the edges of the second flexible layer before they receive the foam-forming resin therebetween to confine the latter during its foaming reaction.

5. An apparatus as set forth in claim 4 including means for joining the juxtaposed edges of the two flexible layers in the course of their travel through the final conveying means whereat the foaming, bonding and hardening reactions of the component resins are completed.

6. An apparatus as set forth in claim 5 including means for feeding resin-impregnated binding cords to the edges of the flexible layers at the inlet of the final conveying means to reinforce the joint between the layers thereat.

7. An apparatus as set forth in claim 6 including cutting means beyond the final conveying means for trimming the lateral edges of the completed laminated panel.

8. An apparatus as set forth in claim 7 including rotary brushes in the path of movement of the top and bottom surfaces of the hardened travelling laminated panel for clearing away the thin flexible webs which had supported the flexible layers prior to their hardening.

9. An apparatus as set forth in claim 8 including means at the outlet of the apparatus for cutting the completed travelling laminated panel into panels of predetermined length.

10. An apparatus as set forth in claim 1 including means for sealing the juxtaposed edges of the two flexible layers following the deposition of the foam-forming resin therebetween to form an envelope for the latter in the course of its passage through said final conveying means.

11. An apparatus for producing laminated structural panels from compatible organic resins having a core of foamed resin with facing layers of hard resin integrally bonded to the opposite faces of the core, comprising (a) means for forming a flexible layer of a heat-hardenable resin in situ by depositing a heat-hardenable resin in a liquid state for hardening into sheet form in the course of travel through the apparatus with a tray-shaped contour in transverse cross-section, (b) means for advancing said flexible layer of heat-hardenable resin;

(c) means for depositing a foam-forming resin in paste form on said flexible layer of tray-shaped section for more easy retention of the latter, which resin is transformed into a cellular state in the course of its travel through the apparatus, (d) means for forming a second flexible layer of a heat-hardenable resin in situ by depositing a heat-hardenable resin in a liquid state for hardening into sheet form in the course of travel through the apparatus, (e) means for advancing said second flexible layer into superposed relation to said first flexible layer and foam-forming resin on the latter, (f) means for sealing the juxtaposed edges of the two flexible layers to form an envelope for the foam-forming resin therebetween, and (g) means for conveying said flexible layers as an envelope for said foaming resin therebetween for a sufficient distance to complete the foaming of the latter and the bonding thereof to the flexible layers as they harden to become facing layers for the core of foamed resin therebetween.

12. An apparatus for producing laminated structural panels from compatible organic resins having a core of foamed resin with facing layers of hard resin integrally bonded to the opposite faces of the core, comprising (a) means for forming a flexible layer of a heat-hardenable resin in situ by depositing a heat-hardenable resin in a liquid state for hardening into sheet form in the course of travel through the apparatus, (b) means for advancing said flexible layer of heat-hardenable resin;

(c) means for depositing a foam-forming resin in paste form on said flexible layer, which resin is transformed into a cellular state in the course of its travel through the apparatus, (d) means for attaching resin-impregnated cords adjacent to each lateral edge of said flexible layer in conjunction with the deposition of the foam-forming resin thereon for confining the foam-forming paste resin therebetween, (e) means for forming a second flexible layer of a heat-hardenable resin in situ by depositing a heat-hardenable resin in a liquid state for hardening into sheet form in the course of travel through the apparatus, (f) means for advancing said second flexible layer into superposed relation to said first flexible layer and foam-forming resin on the latter, (g) means for sealing the juxtaposed edges of the two flexible layers beyond said impregnated cords to form an envelope for the foam-forming resin therebetween, and (h) means for conveying said flexible layers with the foaming resin therebetween for a sufficient distance to complete the foaming of the latter and the bonding thereof to the flexible layers as they harden to become facing layers for the core of foamed resin therebetween.

13. An apparatus for producing laminated structural panels from compatible organic resins having a core of foamed resin with facing layers of hard resin integrally bonded to the opposite faces of the core, comprising (a) means for forming a flexible layer of a heat-hardenable resin in situ by depositing a heat-hardenable resin in a liquid state for hardening into sheet form in the course of travel through the apparatus, (b) means for advancing said flexible layer of heat-hardenable resin;

(c) means for depositing a foam-forming resin in paste form on said flexible layer, which resin is transformed into a cellular state in the course of its travel through the apparatus, (d) means for forming a second flexible layer of a heat-hardenable resin in situ by depositing a heat-hardenable resin in a liquid state for hardening into sheet form in the course of travel through the apparatus, (e) means for advancing said second flexible layer into superposed relation to said first flexible layer and foam-forming resin on the latter, (f) means for sealing the juxtaposed edges of the two flexible layers to form an envelope for the foam-forming resin therebetween, and (g) means for conveying said flexible layers with the foaming resin therebetween for a sufficient distance to complete the foaming of the latter and the bonding thereof to the flexible layers as they harden to become facing layers for the core of foamed resin therebetween, comprising a pair of superposed endless belts with the space between them corresponding to the thickness of the final laminated panel resulting from the expansion of the foamed core within the fluid-tight envelope formed by the two flexible layers.

14. An apparatus as set forth in claim 13 wherein the sealing means for the juxtaposed edges of the flexible layers comprises a plurality of cooperating clamping jaws adapted to pinch together the successive portions of the juxtaposed edges of the flexible layers in the course of their advancing movement through the machine.

15. An apparatus as set forth in claim 14 wherein said clamping jaws are of rectangular contour to form rectangular flanges projecting beyond the lateral edges of the panels adapted to serve as mounting means for said panels.

16. An apparatus as set forth in claim 14 wherein said clamping jaws are of curved contour to impart curved channel shapes to the lateral edges of the panels adapted to provide interfitting connections for the mounting of said panels.

17. An apparatus as set forth in claim 14 including an endless chain disposed in a substantially horizontal plane on each side of said final conveying means, said clamping jaws being mounted on the links of said endless chains with guide rollers on said links and jaws, and guide rails for said endless chains for controlling the closing and opening movements of said jaws.

18. An apparatus as set forth in claim 17 including supplemental guide rail extensions at the inlet ends of said final conveying means for narrowing the width of the passage of the latter as the envelope of foam-forming resin is introduced therein.

19. An apparatus as set forth in claim 14 including an endless chain disposed in a substantially horizontal plane on each side of said final conveying means, said clamping jaws being mounted on the links of said endless chains with forked spring blades in biased position to close the jaws, and push rods disposed between the forks of the spring blades and adapted to be actuated by the mounting sprockets for the chains at the outlet end of said conveying means for releasing said jaws from said juxtaposed edges.

20. An apparatus as set forth in claim 14 including a pair of endless chains disposed on each side of said flexible layers in convergent angular planes which intersect at each side of said flexible layers whereat the clamping jaws exert their pinching action.

21. An apparatus for producing laminated structural panels from compatible organic resins having a core of foamed resin with facing layers of hard resin integrally bonded to the opposite faces of the core, comprising (a) means for forming a flexible layer of a heat-hardenable resin in situ by depositing a heat-hardenable resin in a liquid state for hardening into sheet form in the course of travel through the apparatus, (b) means for advancing said flexible layer of heat-hardenable resin;

(c) means for feeding structural side members onto each side of said flexible layer preparatory to the deposition of the foam-forming resin thereon between said side members and the superposition of the second flexible layer thereover, (d) means for depositing a foam-forming resin in paste form on said flexible layer between said structural side members, which resin is transformed into a cellular state in the course of its travel through the apparatus, (e) means for forming a second flexible layer of a heat-hardenable resin in situ by depositing a heat-hardenable resin in a liquid state for hardening into sheet form in the course of travel through the apparatus, (f) means for advancing said second flexible layer into superposed relation to said first flexible layer and foam-forming resin on the latter confined by said side members, and (g) means for conveying said flexible layers with the foaming resin therebetween for a sufficient distance to complete the foaming of the latter and the bonding thereof to the flexible layers as they harden to become facing layers for the core of foamed resin therebetween.

22. An apparatus as set forth in claim 21 wherein said final conveying means comprises a pair of superposed endless belts with the space between them corresponding to the depth of said side members and the thickness of the final laminated panel resuting from the expansion of the foamed core within the space defined by the two flexible layers and laterally displaced side members.

23. An apparatus as set forth in claim 22 including means for laterally stretching at least the second flexible layer as the assembly is fed towards the final conveying means.

24. An apparatus as set forth in claim 23 including means for pressing said side members inwardly against the pressure generated by the expansion of the foam resin as the assembly travels through the final conveying means.

25. An apparatus as set forth in claim 22 including an endless chain disposed in a substantially horizontal plane on each side of said final conveying means, a guide rail with camming surfaces for guiding each chain, intermediate clamping jaws connected to spaced links of each chain, and movable top and bottom clamping jaws cooperating with each intermediate jaws for grasping the edges of said flexible layers in response to the movement of chains within said guide rails past said camming surfaces.

26. An apparatus as set forth in claim 25 including pressing elements extending inwardly from said intermediate clamping jaws against the external lateral edges of said structural side members.

27. An apparatus as set forth in claim 21 wherein said structural side members are fed separately onto the sides of the first flexible member from magazines disposed laterally of the latter.

28. An apparatus as set forth in claim 21 wherein said structural side members in continuous flexible form are fed longitudinally and continuously onto the sides of the first flexible layer.

29. An apparatus as set forth in claim 21 wherein said final conveying means comprises an endless belt for supporting and conveying the first flexible layer, said second flexible layer being subjected on its exterior to a pressure above atmospheric pressure to maintain the latter pressed against the side members and thereby to limit the expansion of the foamed core.

References Cited

UNITED STATES PATENTS

| | | | |
|---|---|---|---|
| 3,147,164 | 9/1964 | Adams | 156—79 X |
| 3,257,484 | 6/1966 | Barnette | 264—47 X |
| 3,367,818 | 2/1968 | Voelker | 264—47 |
| 3,435,102 | 3/1969 | Sullhofer | 425—4 X |
| 3,644,606 | 2/1972 | Auge et al. | 156—79 X |
| 3,303,076 | 2/1967 | Carlson, Jr. et al. | 156—79 |
| 2,993,871 | 7/1961 | Shannon et al. | 156—79 X |
| 3,702,274 | 11/1972 | Wooler | 156—79 |
| 3,215,581 | 11/1965 | Carlson et al. | 156—500 X |

PHILIP DIER, Primary Examiner

U.S. Cl. X.R.

156—62.2, 79, 213, 500; 264—47; 425—4, 83